(12) United States Patent
Suzuki

(10) Patent No.: US 6,178,069 B1
(45) Date of Patent: Jan. 23, 2001

(54) MICROACTUATOR AND METHOD OF MANUFACTURING THE SAME

(75) Inventor: Kenichiro Suzuki, Tokyo (JP)

(73) Assignee: NEC Corporation, Tokyo (JP)

( * ) Notice: Under 35 U.S.C. 154(b), the term of this patent shall be extended for 0 days.

(21) Appl. No.: 09/082,151

(22) Filed: May 21, 1998

(30) Foreign Application Priority Data

May 23, 1997 (JP) .................................................. 9-133617

(51) Int. Cl.⁷ .............................. G11B 5/55; G11B 21/10
(52) U.S. Cl. .................................. 360/294.5; 360/294.2; 310/40 MM
(58) Field of Search ................................... 360/104, 105, 360/106, 78.05, 294, 294.1, 294.2, 294.3, 294.5; 310/40 MM

(56) References Cited

U.S. PATENT DOCUMENTS

| | | | |
|---|---|---|---|
| 5,751,683 | * 5/1998 | Kley | 369/101 |
| 5,753,911 | * 5/1998 | Yasuda et al. | 250/306 |
| 5,834,864 | * 11/1998 | Hesterman et al. | 360/78.12 |
| 5,959,808 | * 9/1999 | Fan et al. | 360/106 |

FOREIGN PATENT DOCUMENTS

| | | |
|---|---|---|
| 4-368479 | 12/1992 | (JP) . |
| 5-76187 | 3/1993 | (JP) . |
| 7-322649 | 12/1995 | (JP) . |
| 8-116686 | 5/1996 | (JP) . |
| 8-180623 | * 7/1996 | (JP) . |
| 9-113534 | 5/1997 | (JP) . |
| 9-294383 | * 11/1997 | (JP) . |

* cited by examiner

Primary Examiner—David L. Ometz
(74) Attorney, Agent, or Firm—Sughrue, Mion, Zinn, Macpeak & Seas, PLLC

(57) ABSTRACT

A microactuator includes a pair of stationary elements, a movable element, and a plurality of springs. The stationary elements are fixed to a substrate. The movable element is movably arranged on the substrate and opposes to the stationary elements. The movable element moves parallel to the surface of the substrate by applying a voltage across one of the stationary elements and the movable element. The springs support the movable element to float the movable element above the surface of the substrate. The springs and the movable element are surrounded by at least the stationary elements and externally guarded. A method of manufacturing this microactuator is also disclosed.

17 Claims, 9 Drawing Sheets

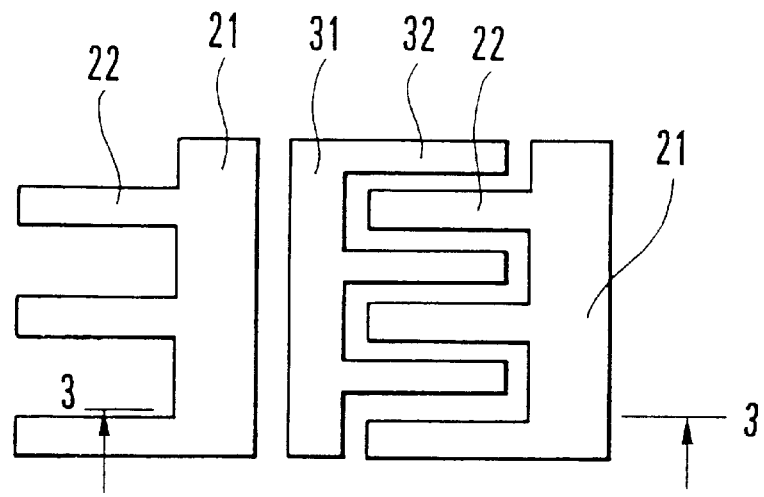
F I G. 2
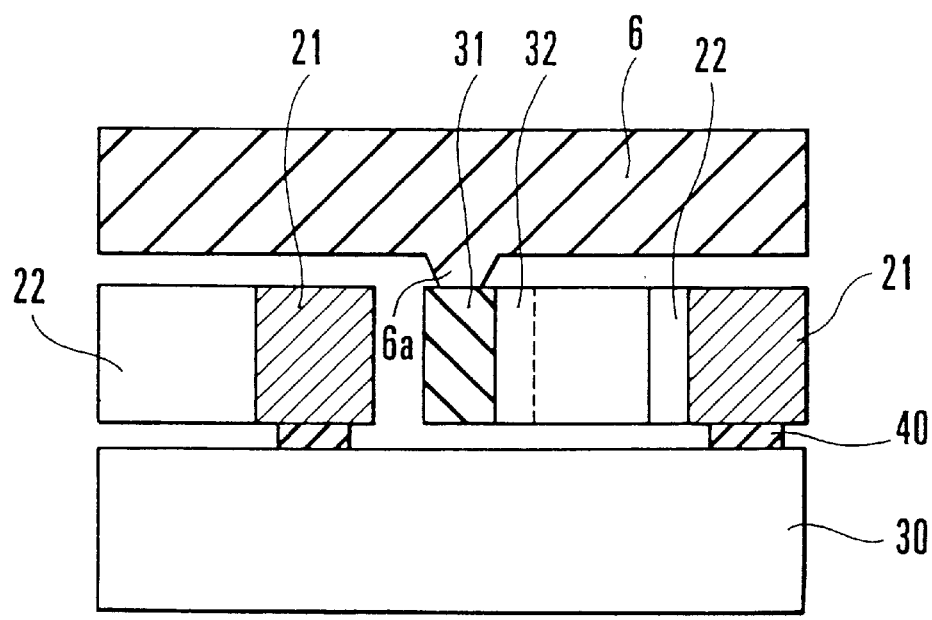
F I G. 3

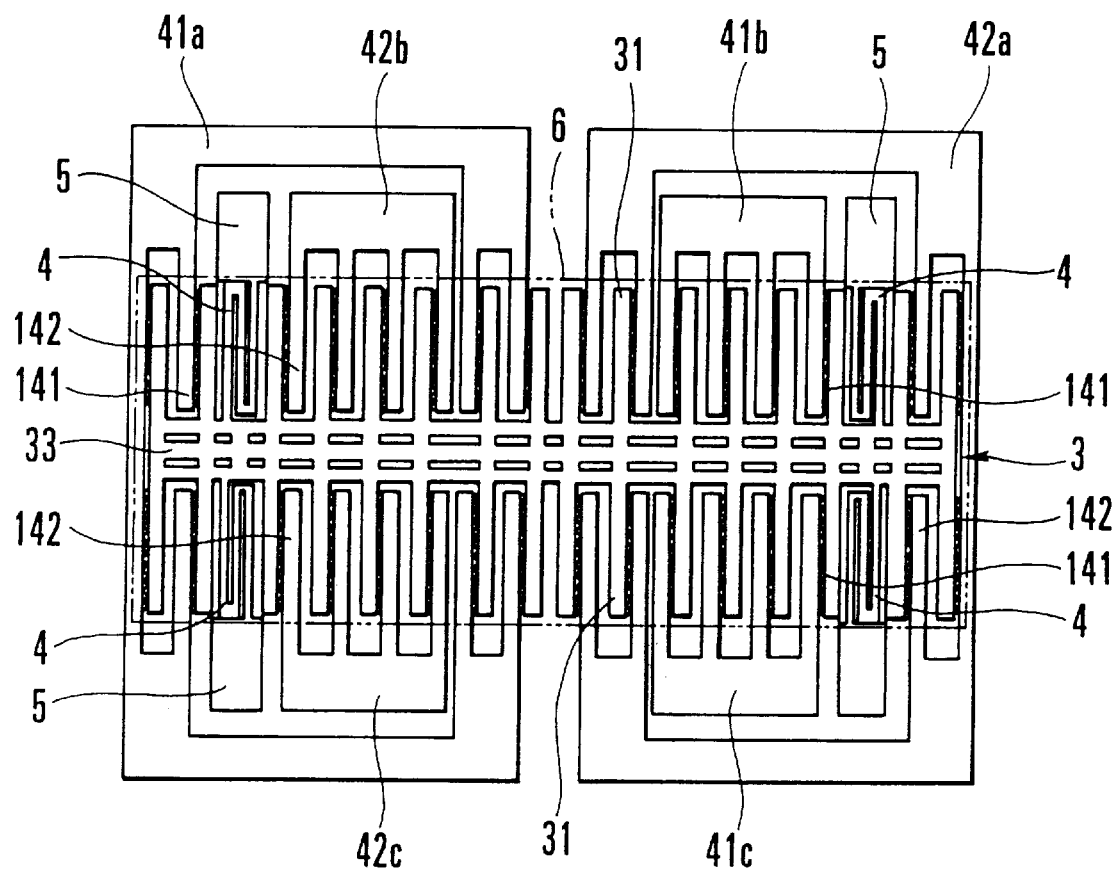
F I G. 4

MICROACTUATOR AND METHOD OF MANUFACTURING THE SAME

BACKGROUND OF THE INVENTION

The present invention relates to a microactuator used to drive optical components and small-size magneto-optical/magnetic disk components, and a method of manufacturing the same.

A microactuator (electrostatic actuator) is generally proposed in which a movable element made of an insulating substance is moved by an electrostatic force generated between a plurality of stationary electrodes and the charges induced by the movable element when a voltage is applied to the plurality of stationary electrodes opposing the movable element at a small gap.

A microactuator mounted at the distal end of a suspension supported by an arm in a magnetic disk apparatus to drive a magnetic head formed integrally with a slider is proposed in L.S. Fan et al., "Magnetic Recording Head Positioning at Very High Track Densities Using a Microactuator-Based, Two-Stage Servo System", IEEE Transactions on Industrial Electronics, Vol. 42, No. 3, pp. 222–233, June 1995 (reference 1).

FIG. 9 shows a microactuator described in reference 1.

In FIG. 9, the conventional microactuator is constituted by a pair of T-shaped stationary elements 83 and 84 which are formed on a silicon substrate (to be described later) and have the distal ends of leg portions opposing each other, and an H-shaped movable element 82 formed between the stationary elements 83 and 84. The movable element 82 is supported by four springs 81 to float above the silicon substrate. One end of each spring 81 is fixed to a corresponding one of a pair of spring bases 80 fixed to the silicon substrate, and the entire spring 81 is separated from the silicon substrate.

The stationary elements 83 and 84 are respectively made up of support portions 83a and 84a, and support portions 83b and 84b constituting leg portions vertically extending from the centers of the support portions 83a and 84a. The end portions of the support portions 83b and 84b oppose each other. Many comb tooth portions 91 are formed in a comb tooth shape at a predetermined pitch in two lines on the two sides of each of the support portions 83b and 84b. As shown in FIG. 10, many stationary element electrodes 93 are formed at a predetermined pitch in a comb tooth shape on one side of each comb tooth portion 91.

The movable element 82 is made up of a pair of parallel support portions 82a and a coupling portion 82b coupling the centers of the support portions 82a. The movable element 82 is combined with the stationary elements 83 and 84 to constitute an actuator. That is, the support portions 82a of the movable element 82 are arranged parallel to sandwich the support portions 83b and 84b of the stationary elements 83 and 84. The coupling portion 82b of the movable element 82 vertically crosses the gap formed by the end portions of the support portions 83b and 84b of the stationary elements 83 and 84.

The movable element 82 comprises many comb tooth portions 92 formed in a comb tooth shape at the same pitch as that between the comb tooth portions 91 of the stationary elements 83 and 84. The comb tooth portions 91 of the stationary elements 83 and 84 and the comb tooth portions 92 of the movable element 82 overlap and interdigitated with each other. As shown in FIG. 10, movable element electrodes 94 to be inserted between the stationary element electrodes 93 are formed on one side of each comb tooth portion 92.

As shown in FIG. 11, the comb tooth portion 91 formed integrally with the stationary element electrode 93 is fixed to a silicon substrate 100 via a stationary element base 101. In contrast to this, the comb tooth portion 92 formed integrally with the movable element electrode 94 is separated from the silicon substrate 100, i.e., floats above the surface of the semiconductor substrate 100 at a predetermined interval.

In this arrangement, the movable element 82 can be moved right or left in FIG. 9, i.e., the comb tooth portion 92 can be moved in a direction to come close to and separate from the comb tooth portions 91 by applying a voltage across the movable element electrode 94 of the comb tooth portion 92 and the stationary element electrodes 93 of the stationary elements 83 and 84. In this case, the movable element 82 can be moved left by applying a voltage to the left stationary element 84 in FIG. 9, or right by applying a voltage to the right stationary element 83.

A method of manufacturing the microactuator having this arrangement will be explained. A 2-$\mu$m thick PSG (PhoshoSilicate Glass) film is patterned in a region on the silicon substrate 100 where the movable element 82 is to be formed. Copper is plated between resist patterns formed on the PSG film using photolithography.

The PSG film is removed using hydrofluoric acid to separate the movable element 82 including the movable element electrode 94 from the silicon substrate 100, thereby forming the copper-plated movable element 82. In this way, the microactuator in reference 1 using a 20-$\mu$m thick copper material is manufactured.

In a microactuator using a silicon IC process, a structure using a polysilicon thin film has conventionally been known well. Compared to the electroplated actuator, the microactuator with a polysilicon structure has good matching with the silicon IC process and exhibits excellent mechanical characteristics. Note that in applications to a magnetic/magneto-optical head and the like, movement of the head in directions other than a desired direction must be suppressed small.

In the microactuator shown in FIG. 9, the movable element 82 must move right and left in FIG. 9, but its movement in a direction perpendicular to the surface of the silicon substrate 100 must be suppressed as small as possible. From this condition, the spring 81 must be made thick. The movable element electrode 94 and the stationary element electrode 93 must also be made thick in order to use a large electrostatic force.

From these conditions, a microactuator having an electrode thickness of 20 $\mu$m or more must be manufactured for practical use. Since the polysilicon thin film has a thickness of about 4 $\mu$m at most, microactuators using the above-described plating technique and a single-crystal silicon etching technique (to be described later) are being developed.

To manufacture a microactuator made of single-crystal silicon, the method using an SOI (Silicon On Insulator) substrate described in A. Benitez et al., "Bulk Silicon Microelectromechanical Devices Fabricated from Commercial Bonded and Etched-Back Silicon-on-Insulator Substrates", Sensors and Actuators, A50, pp. 99–103, 1995 (reference 2) can be employed.

According to this method, the movable element electrode 94 and the stationary element electrode 93 in FIG. 11 are formed of a 20-$\mu$m thick single-crystal silicon film, and the stationary element base 101 is formed of a silicon oxide film. By removing the silicon oxide film positioned below the movable element electrode 94 using hydrofluoric acid, the movable element electrode 94 can be separated from the silicon substrate 100.

In this case, since the movable element electrode 94 is narrower in width than the stationary element electrode 93, the silicon oxide film is still left below the stationary element electrode 93 even upon etching using hydrofluoric acid, and forms the stationary element base 101. In this manner, the movable element electrode 94 and the stationary element electrode 93 each made of, e.g., a 20-$\mu$m thick single-crystal silicon film are formed on the silicon substrate 100.

The method of manufacturing a thick microactuator has been briefly described. The conventional microactuator shown in FIG. 9 is undesirably easily destructed by external shock, as will be described below.

I) To enable the microactuator to use a very weak electrostatic energy, the spring 81 is formed of a wire having a width of 2 $\mu$m and a length of 200 $\mu$m. Accordingly, the restoring force of the spring 81 in the displacement direction of the movable element 82 is very small. Since a slider having a weight of about 1 mg is mounted on the movable element 82, the movable element 82 of the microactuator is easily destructed by even small shock.

The cause of the shock includes collision of the slider against a magnetic disk during the driving of the magnetic head, and sudden contact to the microactuator during the assembly of the microactuator. Also when the microactuator base moves suddenly, an acceleration force acts on to destruct the microactuator because the 1-mg slider is mounted on the movable element 82.

II) A narrow gap having a width of about 2 $\mu$m is formed between the opposing surfaces of the movable element electrode 94 and stationary element electrode 93 of the microactuator. The narrow gap is necessary to efficiently use a voltage applied across the two electrodes 93 and 94. However, if a foreign substance such as dirt enters the gap, the microactuator fails to operate. In the conventional microactuator shown in FIG. 9, this operation failure is frequently caused by such a foreign substance.

III) In the conventional microactuator shown in FIG. 9, the movable element 82 can be moved left by applying a voltage across the left stationary element 84 and the movable element 82, or right by applying a voltage to the right stationary element 83. During this driving, the movable element 82 may move not parallel to the surface of the silicon substrate 100 but with an inclination at a certain angle. In this case, the magnetic head is also inclined to the disk surface, so information is erroneously read/written.

In addition, demand arises for structural improvement of a microactuator of this type. More specifically, since the microactuator shown in FIG. 9 has a planar dimension of 2 mm×2 mm, many microactuators can be formed from a silicon wafer having a diameter of 150 mm. Increasing the number of actuators formed from one wafer can directly reduce the cost. In the conventional structure, the spring 81 and the spring base 80 project from the device main body. This obstructs arranging a larger number of actuators. From this viewpoint, the structural improvement of the actuator is eagerly demanded.

SUMMARY OF THE INVENTION

It is an object of the present invention to provide a microactuator highly resistant to shock, and a method of manufacturing the same.

It is another object of the present invention to provide a microactuator which can be manufactured at low cost, and a method of manufacturing the same.

It is still another object of the present invention to provide a high-reliability microactuator which hardly causes an information read/write error, and a method of manufacturing the same.

In order to achieve the above objects, according to the present invention, there is provided a microactuator comprising a pair of stationary elements fixed to a substrate, a movable element movably arranged on the substrate and opposing to the stationary elements, the movable element moving parallel to a surface of the substrate by applying a voltage across one of the stationary elements and the movable element, and a plurality of springs supporting the movable element to float the movable element above the surface of the substrate, the springs and the movable element being surrounded by at least the stationary elements and externally guarded.

BRIEF DESCRIPTION OF THE DRAWINGS

FIG. 2 is a partial enlarged view of a stationary element and a movable element shown in FIG. 1;

FIG. 3 is a sectional view taken along the line 3—3 in FIG. 2;

FIG. 4 is a plan view of a microactuator according to the second embodiment of the present invention;

DESCRIPTION OF THE PREFERRED EMBODIMENTS

The present invention will be described in detail below with reference to the accompanying drawings.

Figure 1:
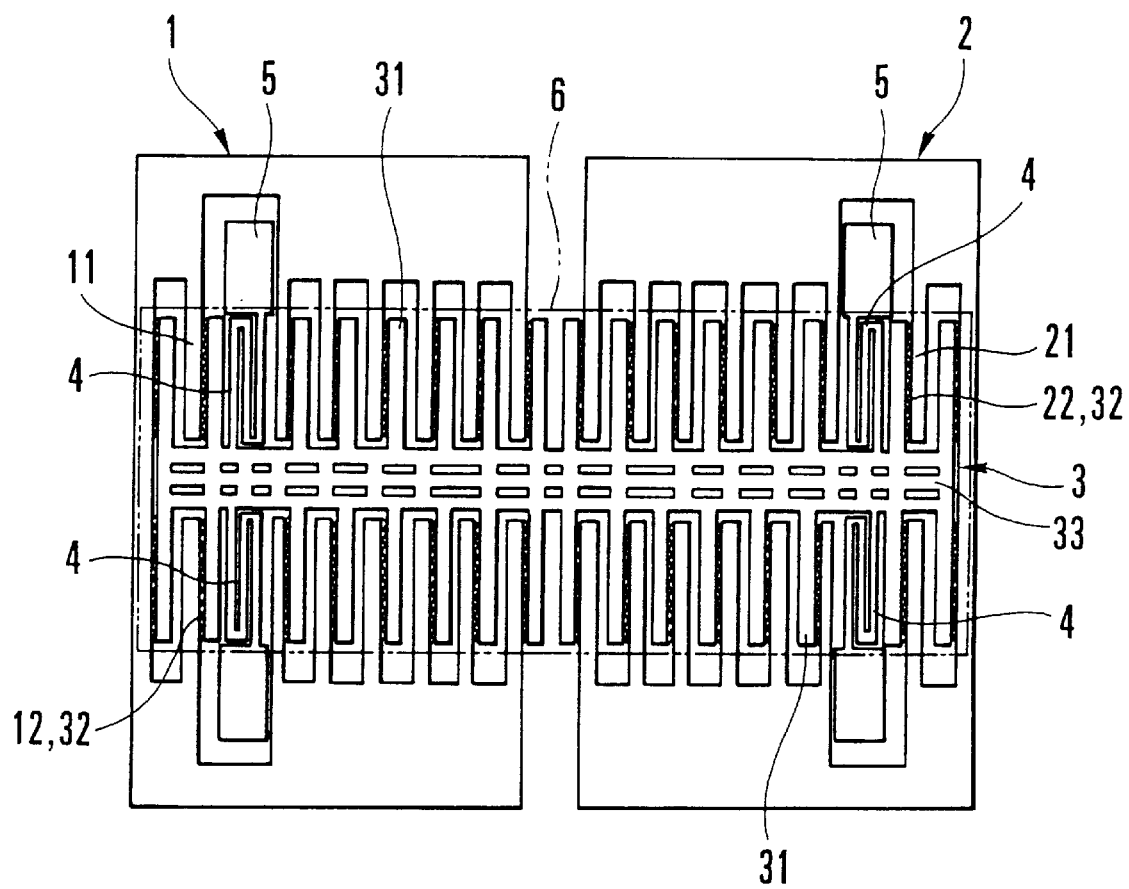
FIG. 1 is a plan view of a microactuator according to the first embodiment of the present invention.

FIG. 1 shows a microactuator according to the first embodiment of the present invention. In FIG. 1, the actuator is constituted by a pair of U-shaped stationary elements 1 and 2, which are fixed to a semiconductor substrate (to be described later) and have opposing openings, and a movable element 3 with a support portion 33, which is separated from the semiconductor substrate and engages with openings of the stationary elements 1 and 2. The two longitudinal ends of the movable element 3 are supported by four springs 4. The springs 4 are separated from a semiconductor substrate 30, similar to the movable element 3, and connected to spring bases 5 fixed to the semiconductor substrate 30. A stage 6 is arranged on the entire surface of the movable element 3.

The stationary elements 1 and 2 respectively have many comb tooth portions 11 and 21 formed in a comb tooth shape at a predetermined pitch such that the comb tooth portions 11 or 21 oppose each other in two lines. On one-side portions of the comb tooth portions 11 and 21, many stationary element electrodes 12 and 22 are respectively formed in a comb tooth shape at a predetermined pitch, as shown in FIG. 2. The movable element 3 has many comb tooth portions 31 formed in a comb tooth shape on the two sides of the support portion 33 so as to alternately overlap the comb tooth portions 11 and 21 of the stationary elements 1 and 2. On one side of each comb tooth portion 31, a plurality of movable element electrodes 32 are formed to alternately overlap the stationary element electrodes 12 and 22.

The comb tooth portions 11 and 21 of the stationary elements 1 and 2 have larger widths than that of the comb tooth portion 31 of the movable element 3. The comb tooth portions 11 and 21 of the stationary elements 1 and 2 are bonded to the silicon substrate 30 via stationary element bases 40, as shown in FIG. 3. The movable element electrode 32 is separated from (floats at a predetermined interval above) the surface of the silicon substrate 30 together with the comb tooth portion 31.

When a voltage is applied across the movable element electrode 32 and the stationary element electrodes 12 and 22 of the stationary elements 1 and 2, the movable element 3 moves right or left in FIG. 1, i.e., the comb tooth portion 31 of the movable element 3 shifts in a direction to come close to and separate from the comb tooth portions 11 and 21 of the stationary elements 1 and 2. In this case, the movable element 3 moves left by applying a voltage across the left stationary element 1 and the movable element 3 in FIG. 1, or right by applying a voltage across the right stationary element 2 and the movable element 3.

In the microactuator of the first embodiment, as shown in FIG. 1, the other end of the spring 4 with one end fixed to the spring base 5 is bent in a zigzag shape and guided between the comb tooth portions 31 near the end of the movable element 3 to support the support portion 33. A support portion 6a projecting from the lower surface of the stage 6 is connected to a corresponding comb tooth portion 31 of the movable element 3. With this structure, the stage 6 covering the entire surface of the movable element 3 moves following the movement of the movable element 3.

The comb tooth portion 31 and movable element electrode 32 of the movable element 3 are made of single-crystal silicon having a width of 3 $\mu$m and a height of 20 $\mu$m. The comb tooth portions 11 and 21 of the stationary elements 1 and 2 are formed of single-crystal silicon having a width of 10 $\mu$m and a height of 20 $\mu$m. The stationary element electrodes 12 and 22 are formed of single-crystal silicon having a width of 3 $\mu$m and a height of 20 $\mu$m, similar to the movable element electrode 32. In this case, although the stationary element electrodes 12 and 22 float above the surface of the semiconductor substrate 30, they do not move even upon application of a voltage because the comb tooth portions 11 and 21 are fixed to the semiconductor substrate 30. The stage 6 has a thickness of 0.1 mm and a 1.5 mm×2 mm rectangular shape and is made of a metal such as copper or nickel.

Figure 9:
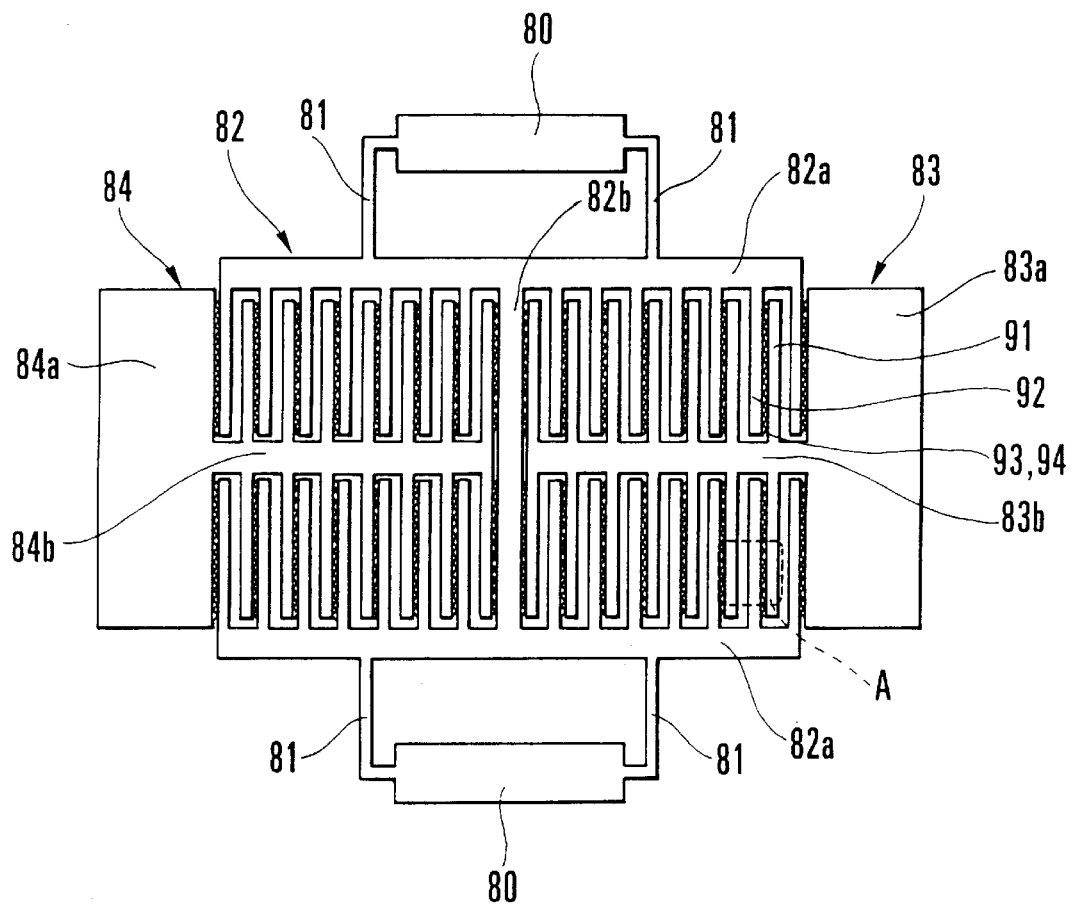
FIG. 9 is a plan view of a conventional microactuator.
Figure 10:
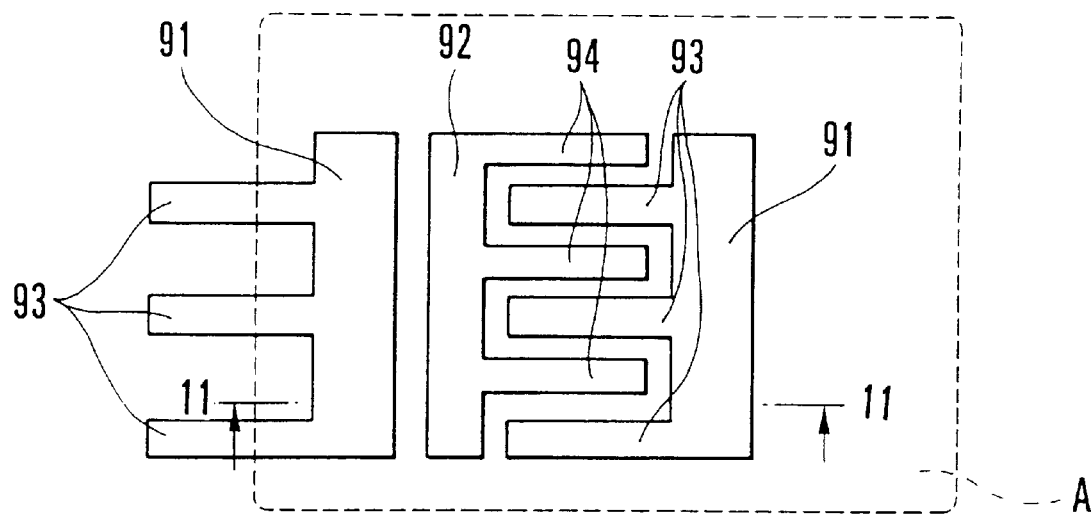
FIG. 10 is an enlarged plan view of a portion A in FIG. 9.
Figure 11:
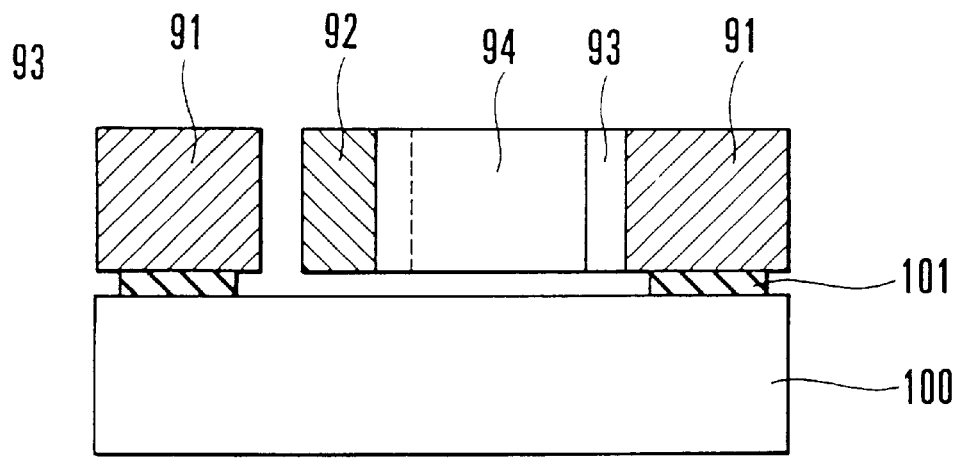
FIG. 11 is a sectional view taken along the line 11—11 in FIG. 10.

According to the first embodiment, as shown in FIG. 1, the movable element 3 and the spring 4 are surrounded by the stationary elements 1 and 2 in order to guard the movable element 3 and the spring 4 which are easily destructed by contact to an external object. Particularly, the two sides of the spring 4 are guarded by the comb tooth portion 21 or 11 of the stationary element 1 or 2. The movable element 3 and the spring 4 are guarded by the stage 6 and the semiconductor substrate 30 from above and below the movable element 3 and the spring 4. With this structure, an external object is prevented from directly contacting the movable element 3 and the spring 4. A foreign substance such as small dirt or dust hardly enters the structure, compared to the conventional structure shown in FIG. 9. As a result, the destruction of the movable element 3 and spring 4, the operation error of the microactuator, and the like can be reliably prevented.

FIG. 4 shows a microactuator according to the second embodiment of the present invention. The same reference numerals as in FIG. 1 denote the same parts, and a description thereof will be omitted.

In the microactuator of the second embodiment, a pair of stationary elements are respectively constituted by C-shaped divided stationary elements 41a and 42a with opposing openings, divided stationary elements 42b and 42c arranged to oppose each other in the opening of the divided stationary element 41a, and divided stationary elements 41b and 41c arranged to oppose each other in the opening of the divided stationary element 42a. The divided stationary elements 41a, 41b, and 41c are used to drive a movable element 3 left in FIG. 4. The divided stationary elements 42a, 42b, and 42c are used to drive the movable element 3 right.

The divided stationary element 41a surrounds the left half of the movable element 3 and has comb tooth portions 141 opposing each other via a support portion 33 of the movable element 3. Two springs 4 supporting one end of the movable element 3, spring bases 5 to which one-end portions of the springs 4 are respectively fixed, and the divided stationary elements 42b and 42c are arranged within the opening of the divided stationary element 41a. The divided stationary elements 42b and 42c have comb tooth portions 142 opposing each other via the support portion 33 of the movable element 3.

The divided stationary element 42a surrounds the right half of the movable element 3 and has comb tooth portions 142 opposing each other via the support portion 33 of the movable element 3. Two springs 4 supporting the right end of the movable element 3, spring bases 5 to which one-end portions of the springs 4 are respectively fixed, and the divided stationary elements 41b and 41c are arranged within the opening of the divided stationary element 42a. The divided stationary elements 41b and 41c have comb tooth portions 141 opposing each other via the support portion 33 of the movable element 3.

The movable element 3 is arranged within the openings of the divided stationary elements 41a and 42a such that comb tooth portions 31 of the movable element 3 alternately overlap the comb tooth portions 141 of the divided stationary elements 41a to 41c and the comb tooth portions 142 of the divided stationary elements 42a to 42c. Movable element electrodes and stationary element electrodes are formed to alternately overlap each other on one side where the comb tooth portions 31 of the movable element 3 oppose the comb tooth portions 141 and 142 of the divided stationary elements 41a to 41c and divided stationary elements 42a to 42c, as shown in FIG. 2.

This structure has the following characteristic features, compared to the first embodiment.

1) It is well known that a force perpendicular to the surface of a semiconductor substrate 30 acts on the movable element 3 in addition to a force to move the movable element 3 parallel to the semiconductor substrate 30 upon application of a driving voltage to the comb tooth electrode structure. This is caused by the lines of electric force asymmetrical in the perpendicular direction of the movable element 3 because of asymmetrical upper and lower structures of the movable element 3. In the structure of the first embodiment, the movable element 3 is inclined to the surface of the semiconductor substrate 30 because the force in the perpendicular direction acts on only a half of the movable element 3 upon driving in this electrode arrangement.

To the contrary, in the structure shown in FIG. 4, a voltage is simultaneously applied to the divided stationary elements 41*a*, 41*b*, and 41*c* in moving the movable element 3 left in FIG. 4. In this case, the divided stationary element 41*a* is positioned in correspondence with the left half of the movable element 3, whereas the divided stationary elements 41*b* and 41*c* are positioned in correspondence with the right half of the movable element 3. A voltage to be applied to the divided stationary elements 41*b* and 41*c* is adjusted to be different from a voltage to be applied to the divided stationary element 41*a*.

Forces in the direction perpendicular to the surface of the semiconductor substrate 30, which act on the movable element 3, are balanced on the left and right halves of the movable element 3. Accordingly, the movable element 3 can be prevented from being inclined to the semiconductor substrate 30. In moving the movable element 3 right in FIG. 4, a voltage can be simultaneously applied to the stationary elements 42*a*, 42*b*, and 42*c* to prevent the movable element 3 from being inclined in the direction perpendicular to the surface of the semiconductor substrate 30.

2) Since each of a pair of stationary elements is divided into three parts, the divided stationary elements 41*a* and 42*a* can be used as driving electrodes, and the divided stationary elements 41*b*, 41*c*, 42*b*, and 42*c* can be used as electrodes for detecting electrostatic capacitances between the stationary elements and the movable element 3. This arrangements realizes feedback control of controlling a voltage applied to the divided stationary elements 41*a* and 42*a* while instantaneously measuring the displacement amount of the movable element 3. Consequently, the position of the actuator can be much accurately controlled.

3) In the structure shown in FIG. 4, the divided stationary elements 41*b* and 41*c*, and 42*b* and 42*c* are separately arranged on two sides in the moving direction of the movable element 3. Therefore, independent voltages can be respectively applied to the divided stationary elements 41*b* and 41*c*, and 42*b* and 42*c*. For example, when the movable element 3 is slightly inclined in the moving direction in an initial state owing to variations caused upon forming the springs 4, the movable element 3 can be balanced by applying different voltages to the divided stationary elements 41*b* and 41*c*, and 42*b* and 42*c*. As a result, the movable element 3 can be moved always parallel to the surface of the semiconductor substrate 30.

Although each of a pair of stationary elements is divided into three parts in the second embodiment, the present invention is not limited to this division number. When the displacement of the movable element 3 is to be detected using a divided stationary element electrode, an electrode for balancing the movable element 3 and an electrostatic capacitance electrode for detecting the displacement of the movable element 3 need not be individually arranged. For example, one divided stationary element may be time-divisionally switched between different functions.

In the second embodiment, the movable element 3 and the spring 4 are surrounded by the divided stationary elements 41*a* to 41*c* and 42*a* to 42*c*. However, the present invention is not limited to this and includes all structures in which an external object is prevented from directly contacting the spring 4 and the movable element 3 which are separated from and float above the surface of the semiconductor substrate 30. For example, the spring base 5 may replace the divided stationary elements 41*a* to 41*c* and 42*a* to 42*c*. The spring base 5 can also be used as a member surrounding the spring 4 because it is also fixed to the semiconductor substrate 30.

A special-purpose member constituted to surround the movable element 3 and the spring 4 may be newly arranged on the semiconductor substrate 30. A guard member fixed to the semiconductor substrate may surround the movable element 3 and the spring 4 not entirely but partially.

Figure 5:
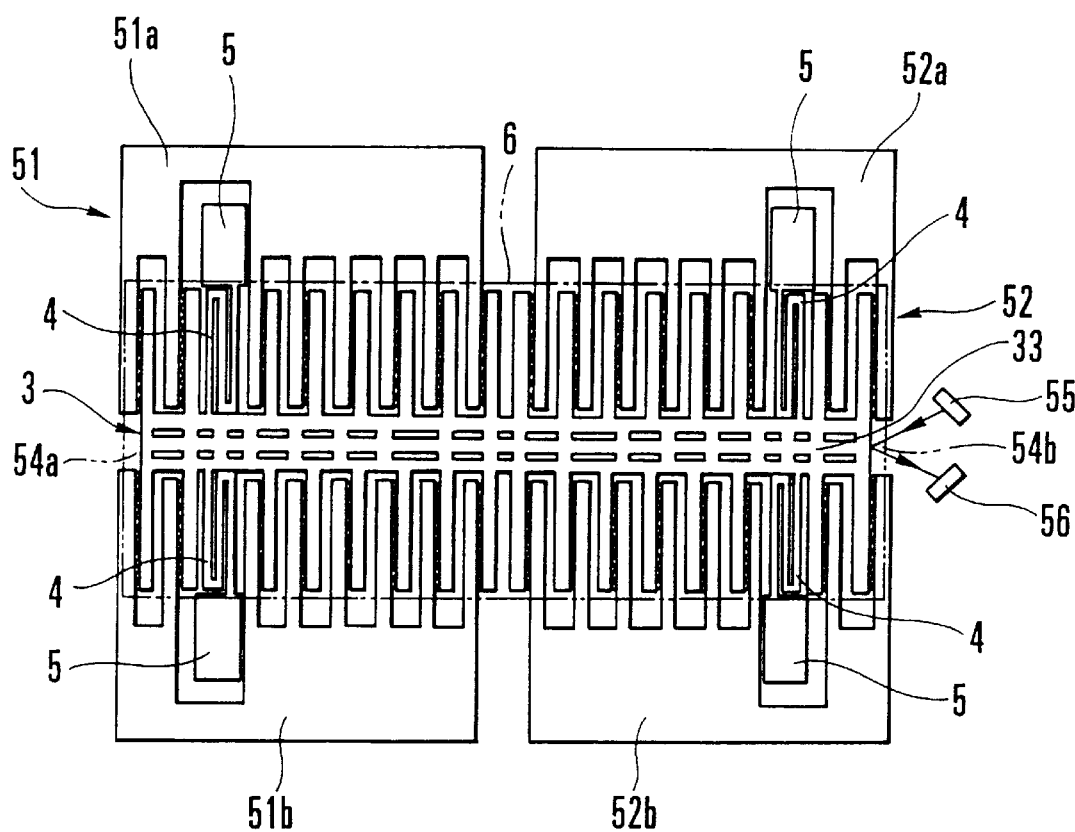
FIG. 5 is a plan view of a microactuator according to the third embodiment of the present invention.

FIG. 5 shows a microactuator according to the third embodiment of the present invention. The same reference numerals as in FIG. 1 denote the same parts, and a description thereof will be omitted.

In the microactuator of the third embodiment, a pair of stationary elements 51 and 52 are respectively constituted by divided stationary elements 51*a* and 51*b*, and 52*a* and 52*b* which oppose each other via a support portion 33 of a movable element 3. Gaps 54*a* and 54*b* are respectively formed between the stationary elements 51*a* and 51*b*, and 52*a* and 52*b* on the two ends of the movable element 3 in the moving direction. A laser 55 and photodiode 56 for detecting the end position of the movable element 3 are arranged at the gap 54*b*.

In this structure, a laser beam emitted by the laser 55 is reflected by the end of the movable element 3, and the reflected beam is received by the photodiode 56. In this manner, the displacement of the movable element 3 can be measured using a light measurement technique.

The microactuator of the present invention is designed for use in fine driving such as positioning of a magnetic head. For this purpose, control with a resolution of 10 nm or less must be realized. This fine displacement is difficult to measure because of, e.g., the presence of a large parasitic capacitance of the semiconductor substrate though the displacement of the movable element 3 can be measured by the electrostatic capacitance, as described with reference to FIG. 4. However, by using a laser beam, as in the third embodiment, the fine displacement can be measured with a precision of 1 nm or less without any problem caused by the parasitic capacitance or the like. The laser 55 and the photodiode 56 may be integrated on the semiconductor substrate 30 on which the microactuator is formed. Alternatively, a hybrid scheme can be employed in which respective components are arranged at proper positions.

Figure 6:
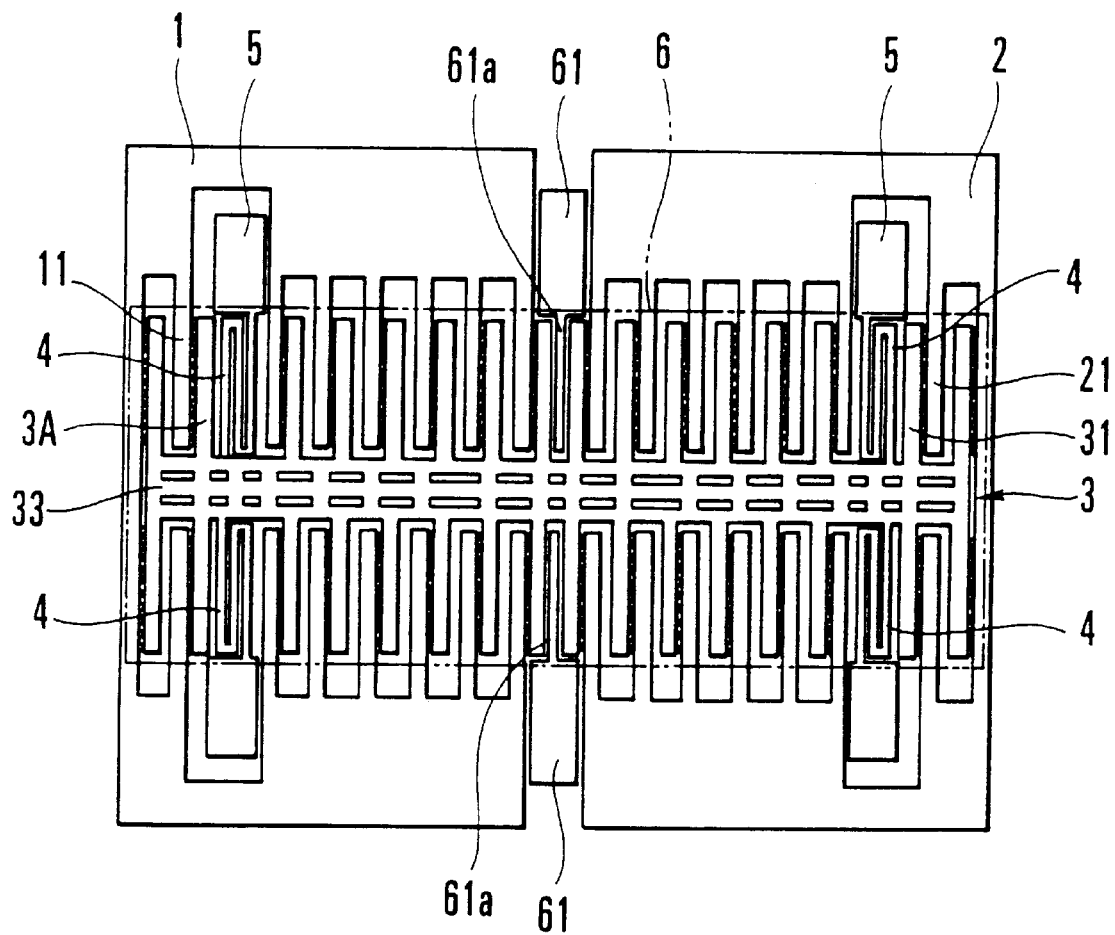
FIG. 6 is a plan view of a microactuator according to the fourth embodiment of the present invention.

FIG. 6 shows a microactuator according to the fourth embodiment of the present invention. The same reference numerals as in FIG. 1 denote the same parts, and a description thereof will be omitted.

In the fourth embodiment, two stoppers 61 are arranged between a pair of stationary elements 1 and 2 to oppose each other via a support portion 33 of a movable element 3. Each stopper 61 is fixed to a semiconductor substrate and formed integrally with a projection 61*a* inserted between comb tooth portions 31 of the movable element 3. The interval (e.g., 1 $\mu$m) between the projection 61*a* of the stopper 61 and the comb tooth portion 31 of the movable element 3 is set smaller than the interval (e.g., 2 $\mu$m) between a comb tooth portion 11 or 21 of the stationary element 1 or 2 and the comb tooth portion 31 of the movable element 3.

When an external force acts on the movable element 3, the comb tooth portion 31 of the movable element 3 collides against the projection 61*a* of the stopper 61 to prevent the movable element 3 from directly colliding against the stationary elements 1 and 2. The stopper 61 can also prevent the stationary elements 1 and 2 from electrically short-circuiting upon driving. The stopper 61 can also prevent springs 4 from being greatly displaced and destructed by an external force.

Since the stopper 61 operates to limit the displacement of the movable element 3 or the spring 4, it also functions to prevent the movable element 3 or the spring 4 from being destructed by a force such as an acceleration force generated even when no object directly contacts the movable element 3 or the spring 4. The position of the stopper 61 is not limited to the one shown in FIG. 6. The stopper 61 can be arranged at a proper position in accordance with the entire design of the microactuator.

Figure 7:
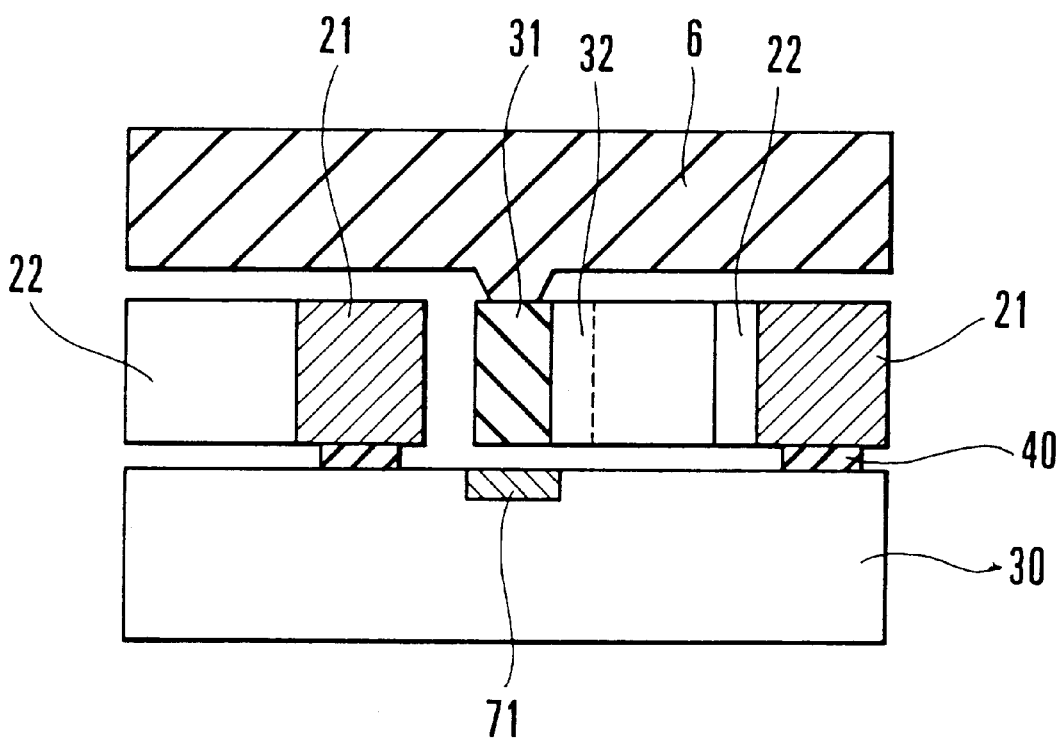
FIG. 7 is a sectional view of the main part of a microactuator according to the fifth embodiment of the present invention.

FIG. 7 shows a microactuator according to the fifth embodiment of the present invention. The same reference numerals as in FIG. 3 denote the same parts, and a description thereof will be omitted.

In the fifth embodiment, a lower control electrode 71 is formed on the surface of a semiconductor substrate 30 in correspondence with a comb tooth portion 31 of a movable element 3. A movable element electrode 32 is normally used at the same potential as that of the semiconductor substrate 30 so as not to be displaced in the direction perpendicular to the surface of the semiconductor substrate 30. The movable element electrode 32 may be displaced in the direction perpendicular to the semiconductor substrate 30 when the movable element 3 is inclined to the surface of the semiconductor substrate 30 due to an unbalanced electrostatic force, as described above, or by a fluid force generated when a slider floats above a magnetic disk surface.

To solve this problem, a voltage is applied across the comb tooth portion 31 of the movable element 3 and the lower control electrode 71 in the fifth embodiment. The lower control electrode 71 is formed in a region slightly larger than the comb tooth portion 31 and the movable element electrode 32 so as to include the moving range of the movable element 3, or in a small region where the comb tooth portion 31 and the movable element electrode 32 are always positioned.

In this case, the lower control electrode 71 may be formed in not only one but also a plurality of regions in order to realize the above purpose. To divisionally form the control electrode 71 in a plurality of regions, for example, different impurities may be diffused in the semiconductor substrate 30. In addition to this diffusion, the control electrode 71 may be formed by depositing an electrode material on the semiconductor substrate 30.

It is particularly useful in a magnetic disk unit to displace the movable element 3 in the direction perpendicular to the surface of the semiconductor substrate 30. This is because the slider floats above the magnetic disk surface. Displacing the movable element 3 is useful in controlling the glide height. For example, in the magnetic disk unit, the disk rotational speed is generally constant. When the slider is positioned at the peripheral portion of the disk, the relative speed with a fluid (air) is high, and a large force perpendicular to the disk acts on the movable element 3. As the slider moves inward on the disk, the fluid speed decreases, and the perpendicular force acting on the movable element 3 decreases.

In the fifth embodiment, the perpendicular displacement of the movable element 3 can be kept constant regardless of the radial position of the slider on the magnetic disk. For this purpose, a low voltage is applied across the movable element 3 and the control electrode 71 when the slider is positioned at the peripheral portion of the magnetic disk. As the slider comes closer to an inner portion of the magnetic disk, the voltage applied to the two members can be increased to compensate a change in fluid force.

FIGS. 8A to 8F show a method of manufacturing the microactuator shown in FIG. 1. In this manufacturing method, the process starts using an SOI wafer prepared by sequentially forming a 2-$\mu$m thick insulating film 81 and a 20-$\mu$m thick silicon film 82 on a 500-$\mu$m thick semiconductor substrate 30.

Figure 8A:
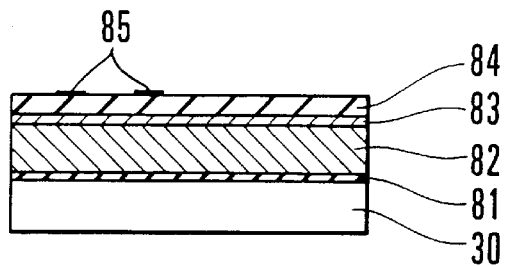
FIGS. 8A to 8F are sectional views, respectively, showing the steps in a method of manufacturing the microactuator shown in FIG. 1.

A diffusion layer 83 of, e.g., boron is formed on the silicon film 82, and then a 3-$\mu$m thick oxide film 84 is formed on the diffusion layer 83. After a 0.3-$\mu$m thick nitride film 85 is formed on the oxide film 84, it is patterned using photolithography (FIG. 8A).

Figure 8B:
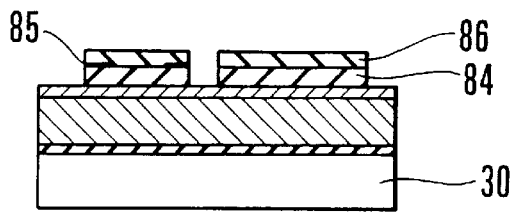
Figure 8C:
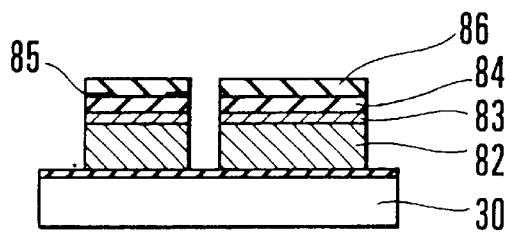

A 3-$\mu$m thick oxide film 86 is formed on the oxide film 84 including the nitride film 85, and then the oxide films 84 and 86 are patterned (FIG. 8B). The diffusion layer 83 and the silicon film 82 are etched using the oxide films 84 and 86 as a mask by a plasma etching apparatus with chlorine gas (FIG. 8C).

Figure 8D:
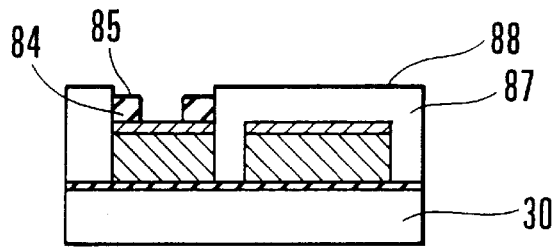

The wafer is dipped in hydrofluoric acid to remove the oxide films 84 and 86. At this time, the nitride film 85 serves as a mask to leave the pattern of the oxide film 84 in only a region corresponding to the comb tooth portion 31 and the electrode 32, as shown in FIG. 8D. Subsequently, a resist is applied to a thickness of 22 $\mu$m to form a resist pattern 87. A seed layer 88 made of titanium and platinum is formed on the resist pattern 87, the nitride film pattern 85, the diffusion layer 83, and the side surface of the oxide film 84.

Figure 8E:
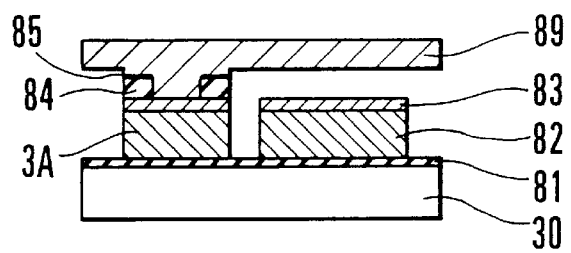

After a resist (not shown) is applied to a thickness of 12 $\mu$m on the seed layer 88 and patterned, copper is plated to form a stage pattern 89. The wafer is dipped in acetone to remove the resist (not shown) and the resist pattern 87 (FIG. 8E).

Figure 8F:
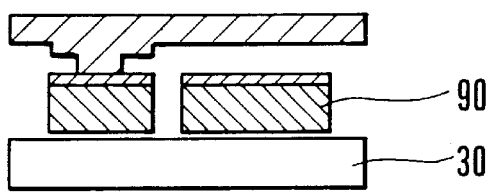

The oxide film 84, and the insulating film 81 below the silicon film 82 corresponding to the movable element 3 (comb tooth portion 31 and movable element electrode 32) are removed using hydrofluoric acid. At this time, most of the insulating film 81 below the silicon film 82 corresponding to the stationary element 2 is removed to leave only an oxide film 90 (FIG. 8F).

After the hydrofluoric acid is washed using a large amount of water, the sample is dried using a freezed dry apparatus so as to prevent the movable element electrode 32 from attaching to the semiconductor substrate 30. As a result, the microactuator is completed.

As has been described above, the microactuator and manufacturing method of the present invention have the following effects.

1) The microactuator is hardly destructed because of a structure for preventing entrance of a fine foreign substance such as dirt. More specifically, the movable element and the spring are surrounded by the stationary element, the stationary element, and the spring, or the stationary element, the spring, the stage, and the semiconductor substrate. Consequently, the actuator can be stably driven over a time 10,000 times longer than the conventional time.

2) The microactuator is scarcely destructed during the manufacturing process. Accordingly, the device yield greatly increases.

3) The number of actuators for one wafer is substantially doubled because whole microactuators can be arranged at a high density. Together with effect 2), the manufacturing cost can be reduced to about $\frac{1}{10}$ the conventional cost.

4) The movable element can be balanced by applying different voltages to a plurality of divided stationary elements or control electrodes formed below the movable element. When this microactuator is applied to the magnetic disk unit, information can be correctly read/written. A high-resolution microactuator excellent in long-term reliability free from any information error can be provided.

What is claimed is:

1. A microactuator comprising:

a substrate;

a pair of stationary elements fixed to said substrate;

a movable element movably arranged on said substrate and opposing said stationary elements, said movable element operative to move parallel to a surface of said substrate by applying a voltage across one of said stationary elements and said movable element; and a plurality of springs supporting said movable element to float said movable element above the surface of said substrate, wherein said stationary elements extend completely around a perimeter of each of said springs, wherein each of said stationary elements includes a first stationary element arranged on a moving direction side of said movable element and opposing one half of said movable element, and a second stationary element arranged on an opposite moving direction side of said movable element and opposing the other half of said movable element, wherein each of said second stationary elements includes divided stationary elements opposing each other via said movable element, and wherein said movable element is balanced by applying, to said divided stationary elements, a voltage different from a voltage to said first stationary element.

2. A microactuator according to claim 1, further comprising:

a plurality of spring bases formed on the surface of said substrate and to which one-end portions of said springs supporting said movable element are respectively fixed, wherein said stationary elements extend completely around a perimeter of each of said spring bases.

3. A microactuator according to claim 1, further comprising:

a stage formed along upper surfaces of said movable element and said stationary elements in correspondence with a region of said movable element, wherein said stage and said substrate prevent said movable element from being inclined in a direction perpendicular to the surface of said substrate.

4. A microactuator according to claim 1, further comprising:

a control electrode formed on said substrate in correspondence with said movable element, wherein said movable element is displaced in a direction perpendicular to the surface of said substrate by applying a control voltage across said control electrode and said movable element.

5. A microactuator according to claim 4, wherein said microactuator positions a magnetic head with respect to a magnetic disk by driving a slider formed integrally with said magnetic head, and wherein a magnitude of the voltage applied across said movable element and said control electrode is changed as said magnetic head moves from an outer peripheral portion of said magnetic disk to an inner peripheral portion thereof.

6. A microactuator according to claim 1, further comprising:

a detecting electrode for detecting a change in electrostatic capacitance between said detecting electrode and said movable element and measuring displacement of said movable element.

7. A microactuator according to claim 1, further comprising:

stopper having a smaller gap between said stopper and said movable element than a gap between said movable element and each of said stationary elements in a moving direction of said movable element.

8. A microactuator according to claim 1, further comprising:

a light source for irradiating an end of said movable element in a moving direction with light; and light-receiving means for receiving the light from said light source which is reflected by the end of said movable element, wherein displacement of said movable element is detected based on a light-receiving output of said light-receiving means.

9. A microactuator according to claim 1, wherein said movable element comprises a plurality of comb tooth portions arranged at a predetermined pitch and each having movable element electrodes on one side, and wherein each stationary element comprises a plurality of comb tooth portions alternately overlapping said comb tooth portions of said movable element and each having stationary element electrodes alternately overlapping said movable element electrodes on one side.

10. A microactuator comprising:

a substrate;

a pair of stationary elements fixed to said substrate;

a movable element movably arranged on said substrate and opposing said stationary elements, said movable element operative to move parallel to a surface of said substrate by applying a voltage across one of said stationary elements and said movable element;

a plurality of springs supporting said movable element to float said movable element above the surface of said substrate, wherein said stationary elements extend completely around a perimeter of each of said springs;

a plurality of spring bases formed on the surface of said substrate and to which one-end portions of said springs supporting said movable element are respectively fixed, wherein said stationary elements extend completely around a perimeter of each of said spring bases; and a stage formed along upper surfaces of said movable element and said stationary elements, said stage mechanically joined to said movable element, wherein said stage and said substrate prevent said movable element from being inclined in a direction perpendicular to the surface of said substrate, wherein each of said stationary elements includes a first stationary element arranged on a moving direction side of said movable element and opposing one half of said movable element, and a second stationary element arranged on an opposite moving direction side of said movable element and opposing the other half of said movable element, wherein each of said second stationary elements includes divided stationary elements opposing each other via said movable element, and wherein said movable element is balanced by applying, to said divided stationary elements, a voltage different from a voltage to said first stationary element.

11. A microactuator according to claim 10, further comprising:
   a control electrode formed on said substrate in correspondence with said movable element,
   wherein said movable element is displaced in a direction perpendicular to a surface of said substrate by applying a control voltage across said control electrode and said movable element.

12. A microactuator according to claim 11, wherein said microactuator positions a magnetic head with respect to a magnetic disk by driving a slider formed integrally with said magnetic head, and
   wherein a magnitude of the voltage applied across said movable element and said control electrode is changed as said magnetic head moves from an outer peripheral portion of said magnetic disk to an inner peripheral portion thereof.

13. A microactuator according to claim 10, further comprising:
   a detecting electrode for detecting a change in electrostatic capacitance between said detecting electrode and said movable element and measuring displacement of said movable element.

14. A microactuator according to claim 10, further comprising:
   a stopper having a smaller gap between said stopper and said movable clement than a gap between said movable element and each of said stationary elements in a moving direction of said movable element.

15. A microactuator according to claim 10, further comprising:
   a light source for irradiating an end of said movable element in a moving direction with light; and
   light-receiving means for receiving the light from said light source which is reflected by the end of said movable element,
   wherein displacement of said movable element is detected based on a light-receiving output of said light-receiving means.

16. A microactuator according to claim 10, wherein said movable element comprises a plurality of comb tooth portions arranged at a predetermined pitch and each having movable element electrodes on one side, and
   wherein each stationary element comprises a plurality of comb tooth portions alternately overlapping said comb tooth portions of said movable element and each having stationary element electrodes alternately overlapping said movable element electrodes on one side.

17. A microactuator comprising:
   a pair of stationary elements fixed to a substrate;
   a movable element opposing said stationary elements and having a plurality of comb tooth portions, said movable element operative to move relative to said substrate by applying a voltage across one of said stationary elements and said movable elements;
   a spring supporting said movable element above said substrate;
   a spring base formed on said substrate and to which one-end portion of said spring supporting said movable element is fixed; and
   a stopper provided between two comb tooth portions of said movable element, said stopper having a smaller distance to said movable clement than the space between said movable element and said stationary elements.

* * * * *